Dec. 5, 1939.  J. CRESPO  2,182,334
PANORAMIC DEVICE
Filed Feb. 18, 1939  2 Sheets-Sheet 1
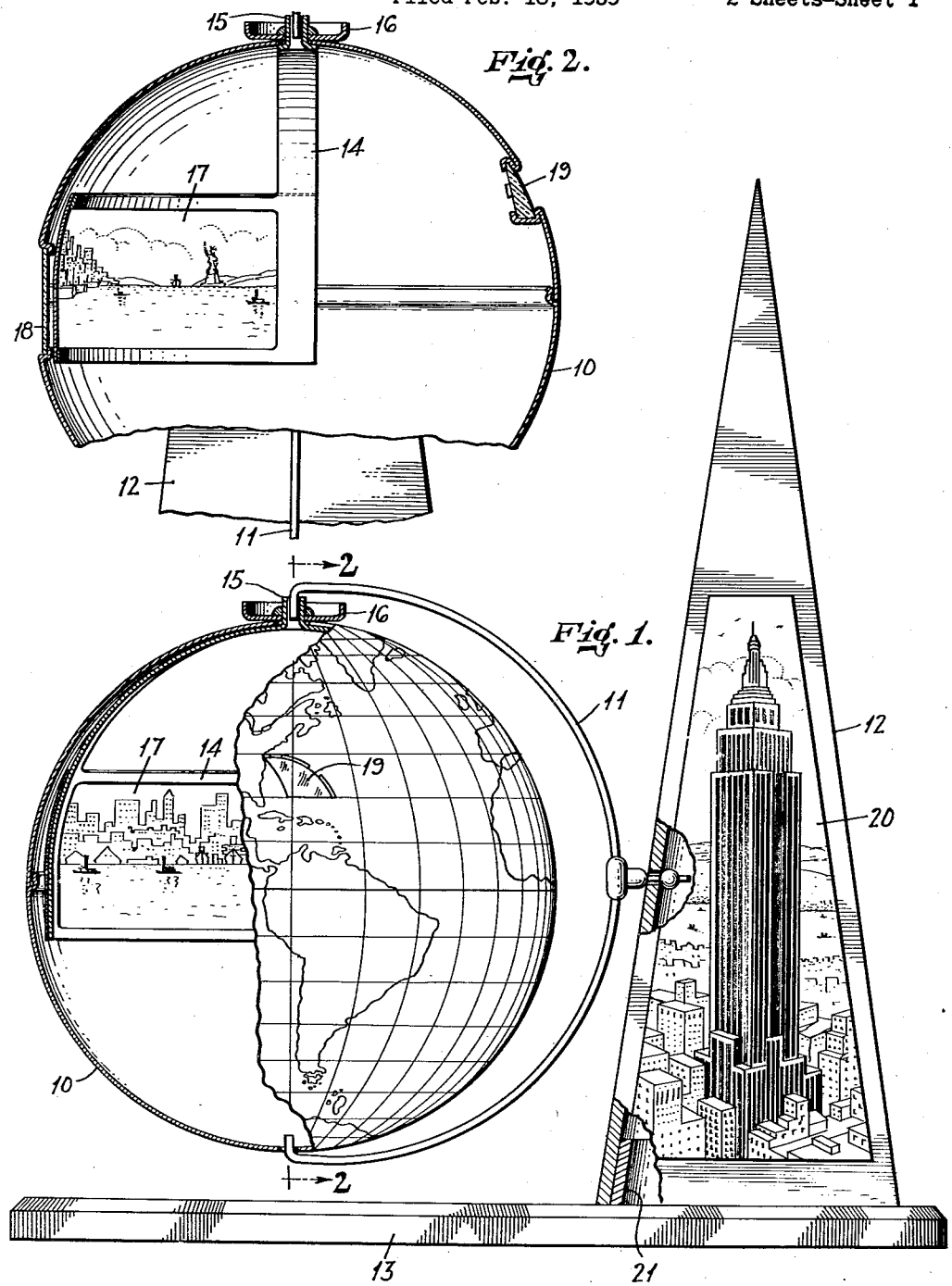
INVENTOR.
JOSEPH CRESPO
BY
ATTORNEYS Dec. 5, 1939.   J. CRESPO   2,182,334
PANORAMIC DEVICE
Filed Feb. 18, 1939   2 Sheets-Sheet 2
Fig. 3.
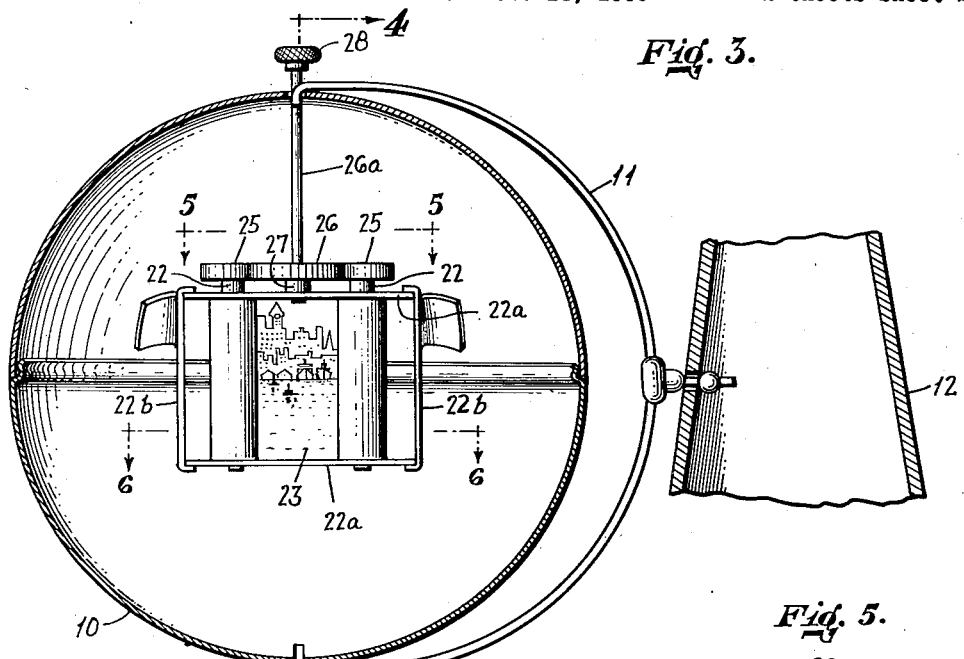
Fig. 4.
Fig. 5.
Fig. 6.
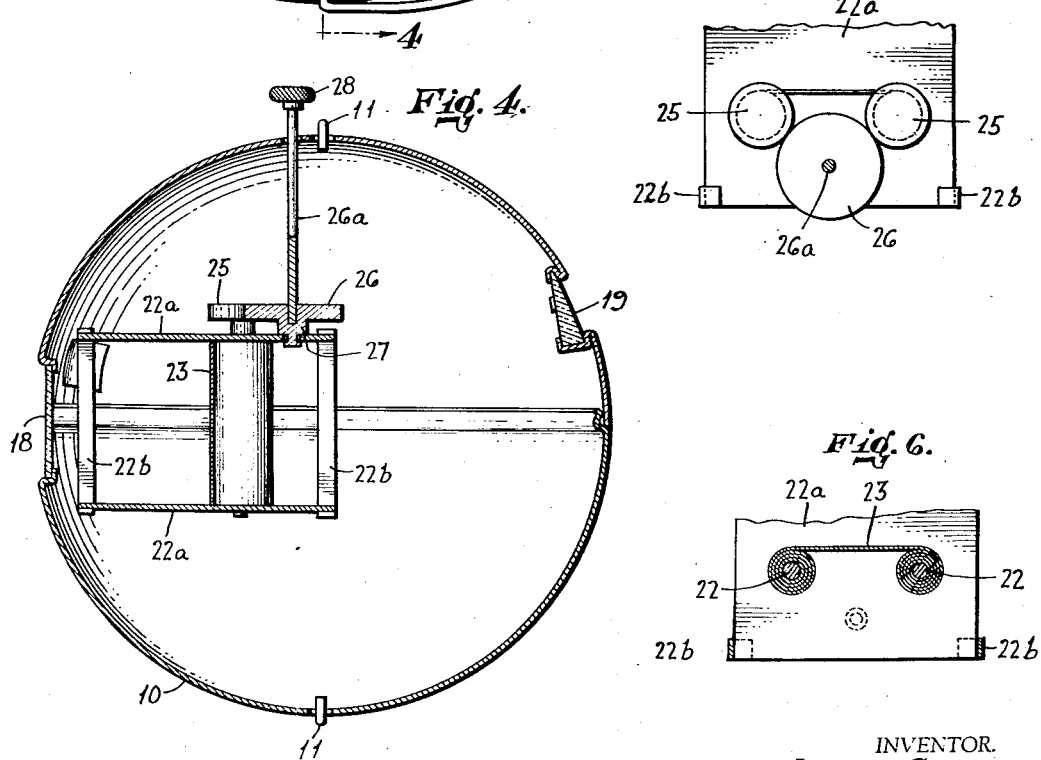
INVENTOR.
JOSEPH CRESPO
BY
Richards & Geier
ATTORNEYS Patented Dec. 5, 1939

2,182,334

UNITED STATES PATENT OFFICE 2,182,334

PANORAMIC DEVICE

Joseph Crespo, New York, N. Y.

Application February 18, 1939, Serial No. 257,050

4 Claims. (Cl. 40—126)

This invention relates to a display device and the like and its principal object is to provide a device of this character which may be used with advantage as an ornamental as well as amusement and educational device.

Another object is to provide a panoramic device by which an extended picture or film containing a multiplicity of views or scenes may be passed before the eye of the spectator.

Other advantages inherent in the invention will become more apparent as the specification proceeds and when taken in conjunction with the accompanying drawings which show a preferred embodiment together with a possible modification.

In the drawings:

Figure 1 is a front elevation of a panoramic, ornamental device according to the invention with portions broken away to show parts in section;

Figure 2 is a cross-section along the line 2—2 of Figure 1;

Figure 3 is a fragmentary cross-sectional view of a modification;

Figure 4 is a section taken along the line 4—4 of Figure 3;

Figure 5 is a fragmentary top plan view taken along the line 5—5 of Figure 4; and, Figure 6 is a fragmentary top plan view taken along the line 6—6 of Figure 4.

Throughout the drawings the same reference characters are used to designate the same or analogous parts.

The invention is carried out by arranging the picture or film within a closed casing and which film can be rotated or rolled and unrolled so that parts of the film may be inspected through a window or a lens in the casing.

Referring in greater detail to the drawings:

The casing 10 in the embodiment shown in the drawings has the configuration and arrangement of a terrestrial globe. The casing or globe 10 is rotatably mounted in the frame 11. The frame 11 is, in turn, rotatably mounted in the ornamental support 12. In this manner, a universal bearing is provided for the casing 10. The support 12 is mounted on the base plate 13.

The ends of the frame 11 are bent inwardly to penetrate into diametrically opposite perforations in the globe which perforations serve the purpose of bearings to permit rotation of the globe.

Within the casing or globe 10 is mounted the rotatable frame 14 which is soldered or otherwise attached to the pivot 15 which projects through the upper opening of the sphere. The pivot 15 also forms a sleeve or a bearing for the inwardly bent end of the frame 11.

The frame may be rotated manually by means of the thumb-nut 16 which is welded or soldered or otherwise connected to the pivot 15. The frame 14 carries a picture or a film 17 which may comprise a multiplicity of scenes or views of a city or a tract of country. The film 17 is illuminated by the light admitted through the window 18 and may be inspected through the lens 19 which, in the embodiment shown, has the configuration of an arrowpoint pointing toward the geographical location of the city of New York on the map shown on the globe. This lens may be inserted into the wall of the sphere simply by making an incision therein and bending the severed ends inwardly and over the lens as shown in Figure 2 of the drawings. The window 18 may be fastened on the opposite side in back of the film 17 in similar manner.

The sphere or globe 10 is preferably made in two halves having over-lapping edges. In this manner, the picture or panorama mounted in the frame 14 may be removed and exchanged.

The ornamental support 12 which in the modification shown in the drawings has the shape of a trylon may be provided with decorative material 20 such as views of a city or tract of land to make the device suitable as a souvenir of the place in which the device was purchased.

The support 12 is preferably movably mounted on the base plate 13 by means of a slip-fit connection produced by the telescopic flange 21.

In the modification shown in Figure 3 the rotatable frame for carrying the panoramic picture has been substituted by the spaced spindles 22 on which the picture film 23 may be wound and unwound, so that the portion of the film may be viewed through the lens 19. The film is illuminated by light admitted through the window 18 in the same manner as in the modification shown in Figures 1 and 2.

The spindles 22 are rotatably mounted on brackets 22a which in turn are mounted in the frame 22b. The frame 22b is supported within the casing 10. Each spindle is provided with a wheel 25 which frictionally engages the wheel 26. The wheel 26 is mounted on the rotatable bearing fitting 27 on the bracket 22a. The wheel 26 is provided with a stem 26a having a thumb-nut 28 outside of the casing 10 by means of which the wheel 26 may be rotated. It will be understood that the rotation of the wheel 26 also rotates the wheels 25 to wind and unwind the film.

It will be understood that the device shown in Figures 1 and 2 as well as the device shown in Figures 3 to 6, inclusive, are operated simply by turning the nuts 16 and 28, respectively. As these nuts are turned a series of scenes or views will pass successively before the lens 19 so that they may be viewed by the spectator.

It will be understood that the invention is not necessarily limited to the exact embodiments illustrated in the drawings, but various modifications may be made within the scope of the appended claims:

What is claimed:

1. A panoramic device comprising a spherical casing representing a terrestrial globe, a support for said globe and means providing a universal bearing connecting said globe to said support, a movable panoramic picture within said casing, means enabling inspection of said picture and means for moving said panoramic picture to pass the various views thereof before the eye of a spectator.

2. A panoramic device comprising a casing, a rotatable frame within said casing, a panoramic picture supported in said frame, means for manually rotating said frame from the outside of said casing, means for illuminating said panoramic picture and means in said casing enabling inspection of said picture.

3. A panoramic device comprising a casing representing a terrestrial globe, a support for said casing and means providing a universal connection connecting said globe to said support, a rotatable frame within said globe, a panoramic picture mounted in said frame, means for manually rotating said frame from the outside of said globe, a window in the wall of said casing for illuminating said panoramic picture, and means in said casing enabling inspection of said picture.

4. A panoramic device comprising a spherical casing representing a terrestrial globe, a support for said globe and means providing a universal bearing connecting said globe to said support, a panoramic picture within said casing and means enabling inspection of said picture.

JOSEPH CRESPO.